United States Patent
Sarda

(10) Patent No.: US 8,356,848 B2
(45) Date of Patent: Jan. 22, 2013

(54) CLAMP FOR HOLDING A CONTAINER BY THE NECK

(75) Inventor: Eric Sarda, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/741,167

(22) PCT Filed: Nov. 7, 2007

(86) PCT No.: PCT/IB2007/004269
§ 371 (c)(1),
(2), (4) Date: Aug. 25, 2010

(87) PCT Pub. No.: WO2009/060255
PCT Pub. Date: May 14, 2009

(65) Prior Publication Data
US 2010/0308611 A1  Dec. 9, 2010

(51) Int. Cl.
*B65G 47/90* (2006.01)
*B65G 47/248* (2006.01)
*B25J 15/00* (2006.01)
(52) U.S. Cl. .......................... 294/90; 294/106
(58) Field of Classification Search .............. 294/90, 294/92, 96, 97, 101, 106, 198; 198/468.2, 198/470.1, 803.3, 803.4, 803.8, 803.11, 803.7; 414/225.01, 226.02; 425/534
See application file for complete search history.

(56) References Cited

U.S. PATENT DOCUMENTS

| 1,047,472 | A | * | 12/1912 | Wilkinson | 294/90 |
| 1,454,193 | A | * | 5/1923 | Thomas | 294/91 |
| 1,457,379 | A | * | 6/1923 | Mareau | 294/100 |
| 1,737,029 | A | * | 11/1929 | Shaffer | 294/90 |
| 2,348,741 | A | * | 5/1944 | Jessen | 294/115 |
| 3,790,205 | A | * | 2/1974 | Wenz | 294/115 |
| 3,938,847 | A | * | 2/1976 | Peyton | 294/110.1 |
| 4,629,389 | A | | 12/1986 | Kontz | |
| 4,708,033 | A | * | 11/1987 | Eash | 81/3.37 |
| 4,909,401 | A | * | 3/1990 | McConnell | 248/312 |
| RE34,953 | E | * | 5/1995 | Denney et al. | 65/260 |
| 5,693,113 | A | * | 12/1997 | Dries et al. | 294/115 |
| 6,399,901 | B1 | * | 6/2002 | Nishino et al. | 141/372 |
| 6,905,012 | B2 | * | 6/2005 | Lopes | 198/404 |
| 8,172,290 | B2 | * | 5/2012 | Nishino et al. | 294/99.1 |
| 2004/0025909 | A1 | | 2/2004 | Lopes | |
| 2010/0061831 | A1 | * | 3/2010 | Nishino et al. | 294/91 |

FOREIGN PATENT DOCUMENTS

| GB | 2120997 | * | 5/1982 |
| JP | 02282115 | * | 11/1990 |
| WO | 2006/077050 A1 | | 7/2006 |

* cited by examiner

*Primary Examiner* — Paul T Chin
(74) *Attorney, Agent, or Firm* — Sughrue Mion, PLLC

(57) ABSTRACT

Clamp (1) for holding a container (2) by a neck (3) in a container handling machine, said clamp (1) comprising a pair of resilient arms (5) and a pair of neck grippers (7) provided at respective ends (6) of the arms (5), said arms (5) and said neck grippers (7) being configured to allow the container neck (3) to be laterally engaged between the neck grippers (7), each neck gripper (7) being pivotally mounted on the corresponding arm (5) about a rotation axis (8), and having at least two gripping jaws (9a, 9b) of different dimensions, configured to cooperate with container necks (3a, 3b) of different sizes.

17 Claims, 5 Drawing Sheets

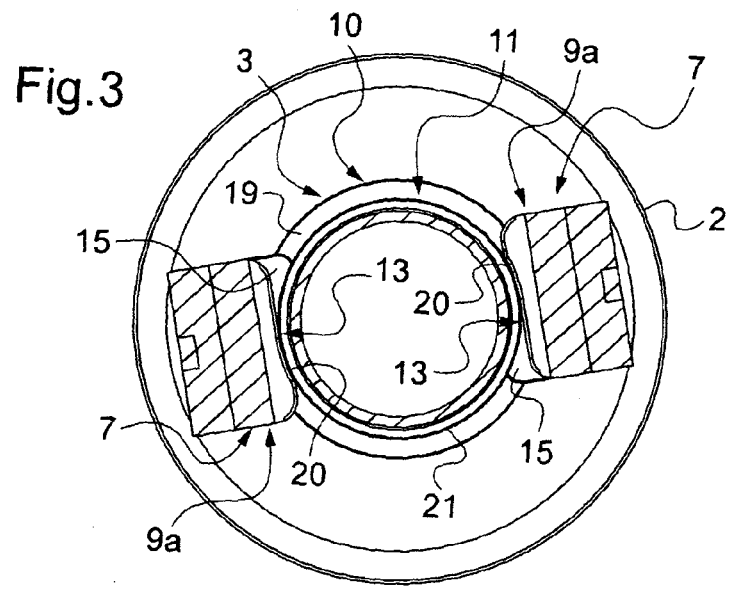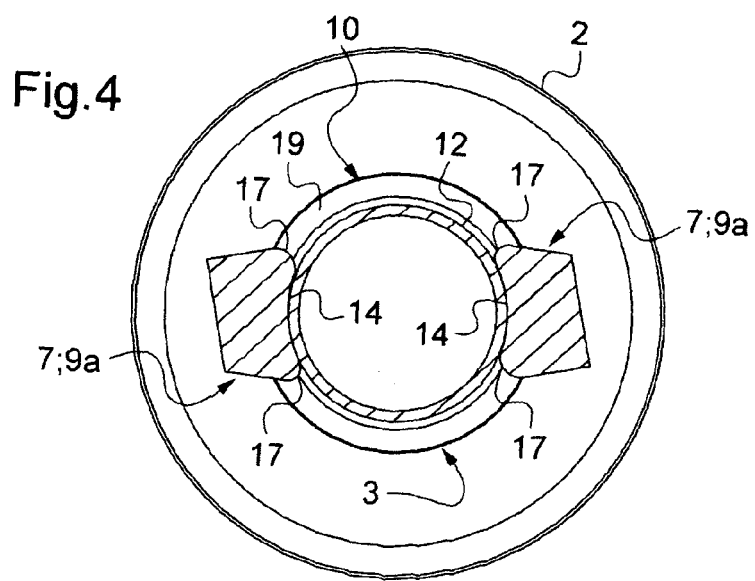

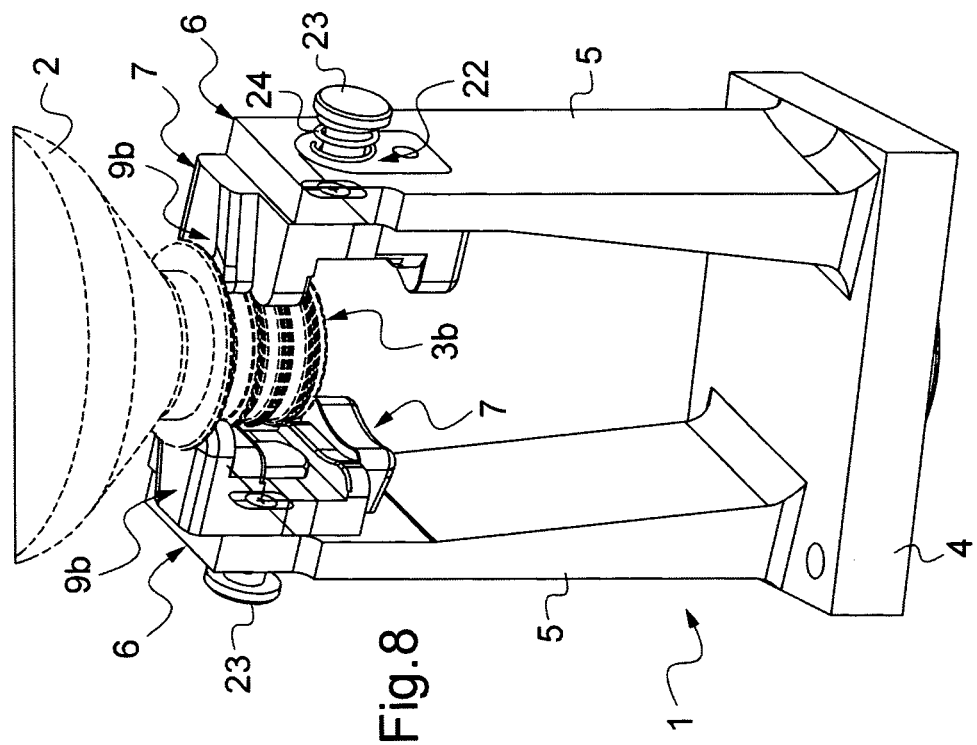
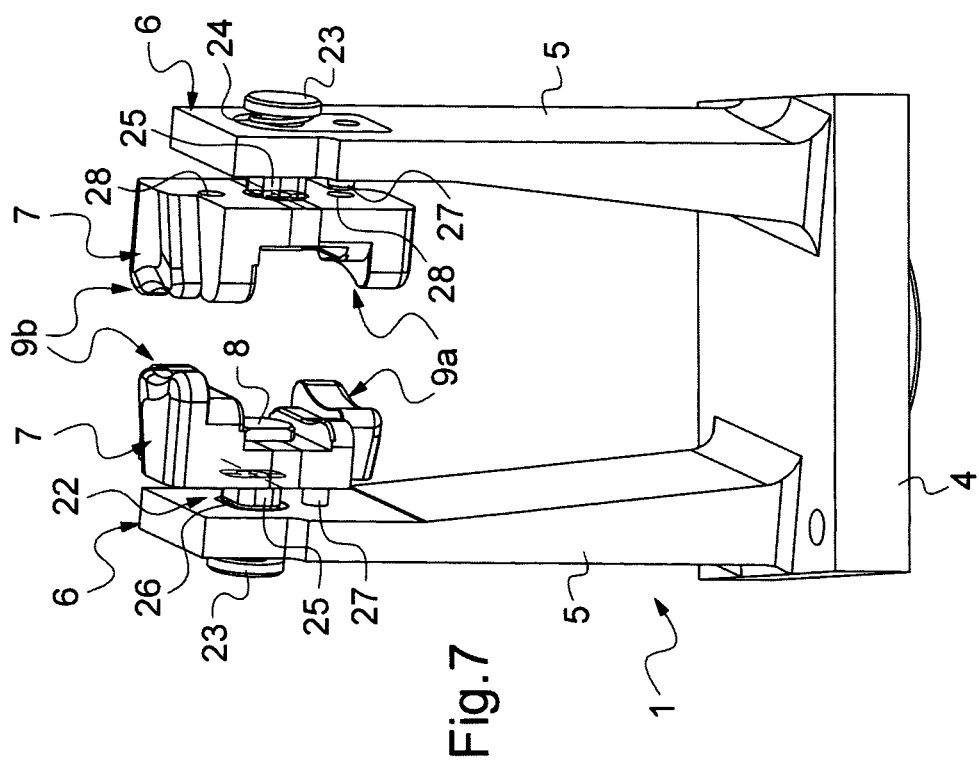

CLAMP FOR HOLDING A CONTAINER BY THE NECK

FIELD OF THE INVENTION

The invention relates to the field of container handling, and more precisely to a clamp for holding a container by a neck in a container handling machine.

BACKGROUND OF THE INVENTION

Plastic containers, and especially plastic bottles, have a neck the dimensions of which are precisely defined and remain unchanged during the manufacturing operations. Most handling machines are provided with clamps configured to hold the containers by the neck. The clamps may vary in shape according to the operation(s) which the containers undergo on the manufacturing line.

Where containers have to be inverted along the path of the manufacturing line, specific clamps are needed in order to hold the containers both ways (up and down). For example, containers are held with the neck down for rinsing operations, whereas they are held with the neck up for filling operations.

An example of such a clamp is disclosed in U.S. Pat. No. 6,905,012 to Lopes (assigned to SIDEL). The clamp comprises a pair of arms constructed to grip the container neck at two opposite places and to allow the neck to be engaged by entering through one side and released from another side.

Such a solution is satisfactory because it allows a safe and quick handling of the containers even when they are twisted to be held upside down.

However, when it is needed to change container format ("format changeover"), it is necessary to replace all clamps in the machine, which is time consuming and requires that room be provided to store the unused clamps.

SUMMARY OF THE INVENTION

It is an object of the invention to provide a solution to the problem of clamp replacement and storing.

The proposed solution is a clamp for holding a container by a neck in a container handling machine, said clamp comprising a pair of resilient arms and a pair of neck grippers provided at respective ends of the arms, said arms and said neck grippers being configured to allow the container neck to be laterally engaged between the neck grippers, wherein each neck gripper is pivotally mounted on the corresponding arm about a rotation axis, and has at least two gripping jaws of different dimensions, configured to cooperate with container necks of different sizes.

The above and other objects and advantages of the invention will become apparent from the detailed description of preferred embodiments, considered in conjunction with the accompanying drawings.

BRIEF DESCRIPTION OF THE DRAWINGS

FIG. 3 and FIG. 4 are cut views of the clamp of FIG. 2, taken along lines III-III and IV-IV, respectively.

FIG. 5 to FIG. 8 are perspective views of the clamp of FIG. 1, illustrating successive steps of a format changeover.

DESCRIPTION OF PREFERRED EMBODIMENTS

Turning now to the drawings, there is shown a clamp 1 for holding a container 2 by a neck 3 in a container handling machine. The clamp 1 is configured to be mounted on an inverter device (such as the one disclosed in U.S. Pat. No. 6,905,012) interposed between an upstream transfer wheel and a downstream transfer wheel to tilt the container 2 upside down and prepare it for a rinsing treatment.

Figure 1:
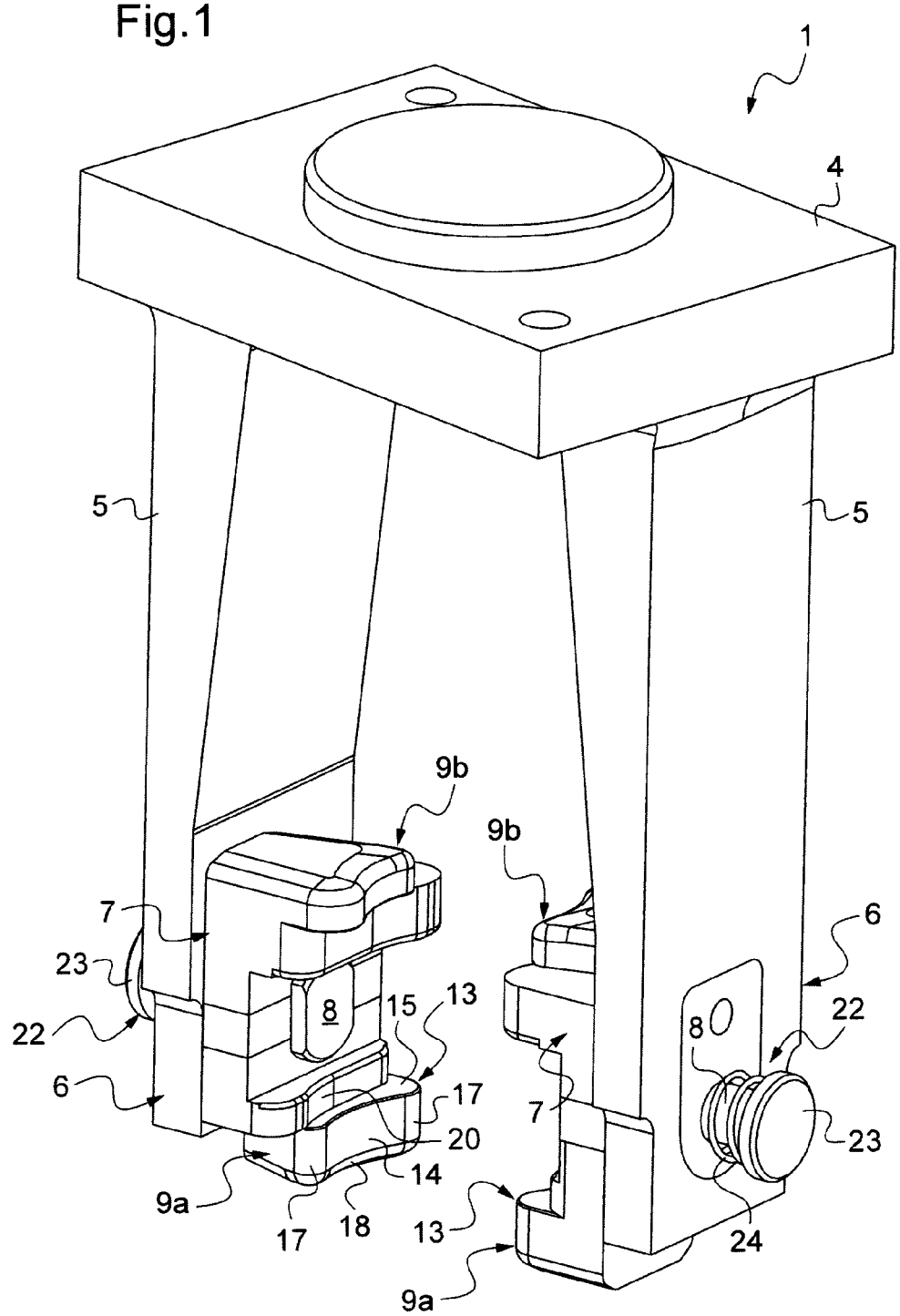
FIG. 1 is a side perspective view of a clamp for holding a container by a neck.

As disclosed in FIG. 1, the clamp 1 comprises a prismatic base 4 by which the clamp 1 is slidingly mounted on a rail of the inverter device, and a pair of parallel resilient arms 5 protruding from the base 4. Provided at respective ends 6 of the arms 5 are neck grippers 7 preferably made from a molded plastic resin.

The arms 5 and the neck grippers 7 are configured to allow the container 2 to be laterally engaged between the arms 5 and clipped by its neck 3 between the neck grippers 7.

Figure 2:
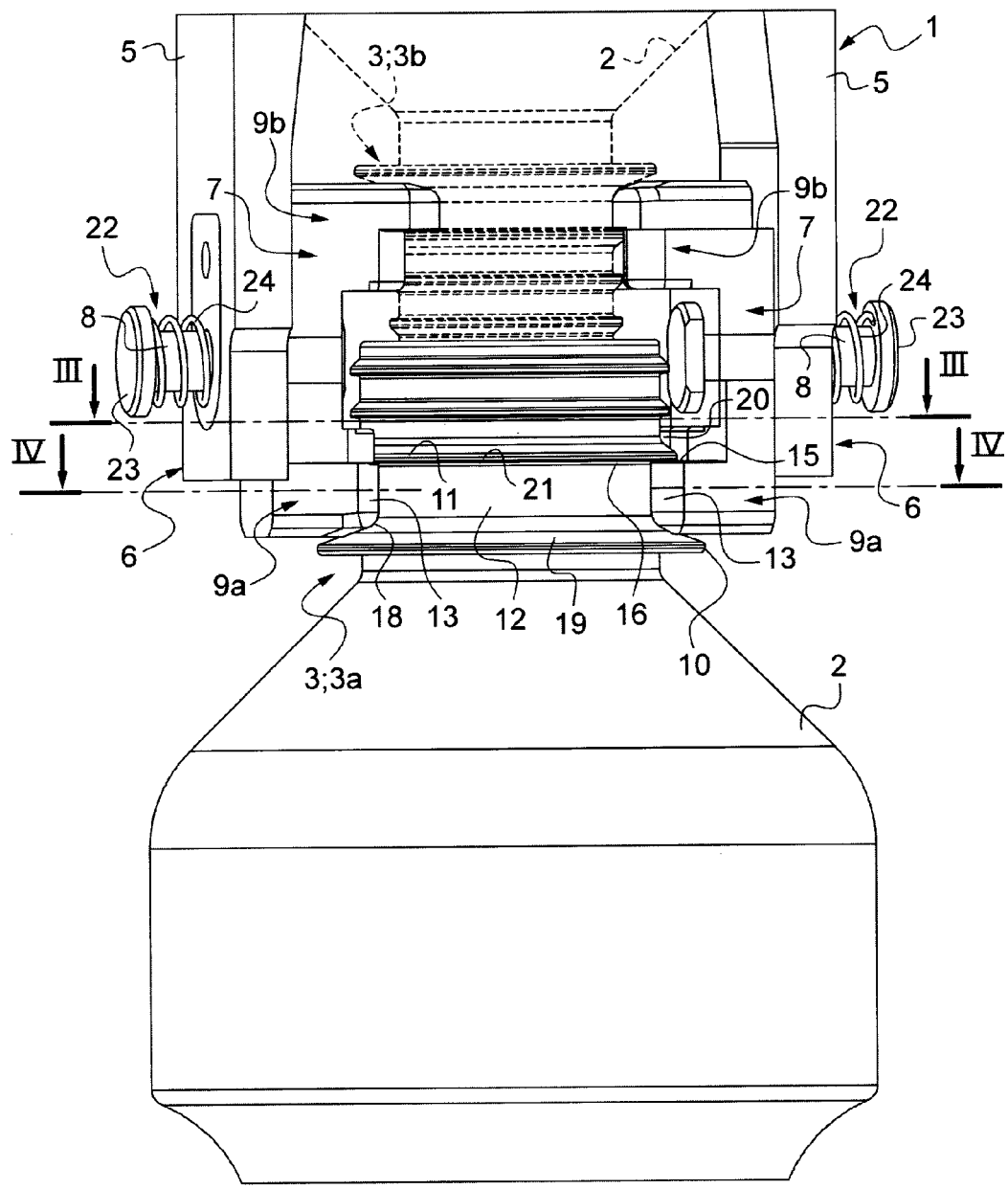
FIG. 2 is an enlarged side view of a detail of the clamp of FIG. 1.

Each neck gripper 7 is pivotally mounted on the corresponding arm 5 about a rotation axis 8 perpendicular to the arm 5 and has at least two gripping jaws 9a, 9b of similar shape but different dimensions, configured to cooperate with container necks 3 of different sizes, as depicted in continuous and dashed lines on FIG. 2.

In a preferred embodiment depicted on the drawings, each neck gripper 7 comprises one pair of gripping jaws 9a, 9b, i.e. a first gripping jaw 9a corresponding to a container neck 3a of a first format, and a second gripping jaw 9b corresponding to a container neck 3b of a second format, different from the first format, located at 180° with respect of the rotation axis 8.

Each gripping jaw 9a, 9b is designed to adapt to the shape of the corresponding container neck 3a, 3b. As depicted on FIG. 2, each container neck 3 comprises an annular collar 10 and, spaced therefrom, an annular flange 11 of lower diameter located adjacent screw or annular threads for screwing or clipping of a closure cap onto the neck 3. Between the collar 9 and the annular flange 11 is defined a groove 12 of predetermined depth and height.

Each gripping jaw 9a, 9b comprises a rounded tooth 13 having a shape complementary to a portion of the container neck 3 including the collar 10, the annular flange 11 and the groove 12. More precisely, the rounded tooth 13 comprises a cylindrical contact surface 14 configured to cooperate with (i.e. to fit tightly around) the groove 12, as depicted on FIG. 2 and FIG. 4, and a planar contact surface 15 configured to cooperate with a lower surface 16 (facing the collar) of the annular flange 11, see FIG. 2 and FIG. 3.

As depicted on FIG. 1, each rounded tooth 13 also comprises rounded chamfers 17 provided laterally on each side of the cylindrical contact surface 14 in order to facilitate clipping and release of the container neck 3 during loading and unloading operations. The rounded tooth 13 further includes an arcuate rounded lower contact surface 18 configured to cooperate with an upper surface 19 of the collar, of complementary shape.

The planar contact surface 15 is limited sidewise by a rounded contact surface 20 configured to cooperate with a circular edge 21 of the annular flange 11.

Accordingly, when engaged laterally between the arms 5, the container neck 3 slips between and against the rounded teeth 13, thereby pushing the neck grippers 7 and slightly flexing the arms 5, until the container 2 is clipped and tightly held between a pair of identical teeth 13.

The clamp 1 further comprises a lock-and-release mechanism 22 provided for each neck gripper 7, for putting a gripping jaw 9a, 9b of a requested format in a use position where the gripping jaw 9a, 9b is turned outwards with respect of the corresponding arm 5, suitable for gripping a container neck 3 of corresponding dimensions and complementary shape. While a gripping jaw 9a of a first format is in the use position, the gripping jaw 9b of the second format is in an inactive position, turned inwards with respect of the corresponding arm 5 (see e.g. FIG. 2).

The lock-and-release mechanism 22 has two positions, i.e. a locking position wherein rotation of the neck gripper 7 is blocked, and a release position wherein rotation of the neck gripper 7 is allowed for a 180° twist, whereby the gripping jaws 9a, 9b can be swapped at the end of the arm 5.

The lock-and-release mechanism 22 comprises a button 23 provided at an outer end of the rotation axis 8, and a return spring 24 mounted on the axis 8 between an inner face of the button 23 and an outer wall of the arm 5, for biasing the neck gripper 7 towards the arm 5.

Each neck gripper 7 is slideable with respect of the arm 5 along the rotation axis 8 between the locking position (where the neck gripper 7, under biasing of the return spring 24, is pulled against an inner wall of the arm 5) and the release position (where, under a manual pressure on the button 23, the neck gripper 7 is spaced from the inner wall of the arm 5).

Figure 5:
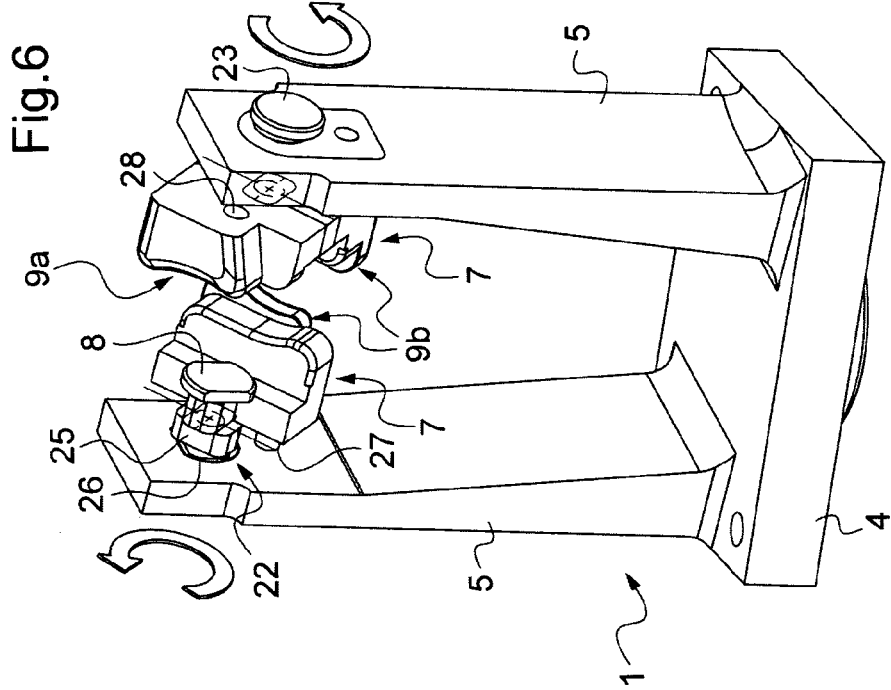
Figure 6:
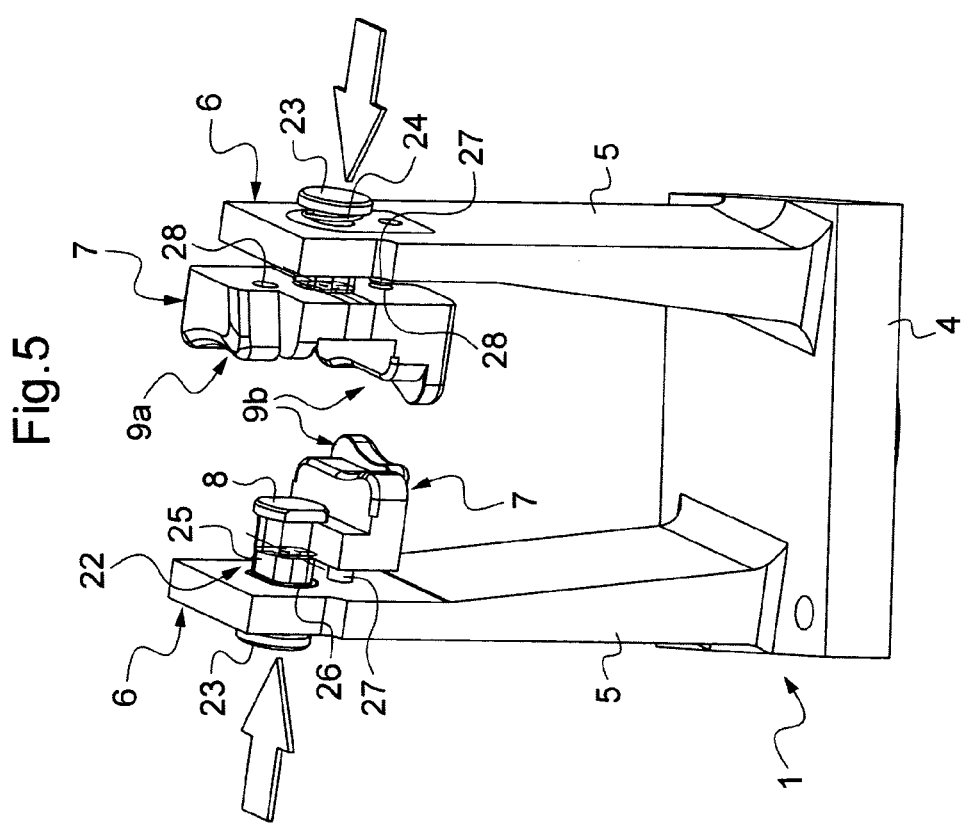

As depicted on FIG. 5 and FIG. 6, where one gripping jaw of the neck gripper 7 on the left has been cut to show the inner structure of the clamp 1, the lock-and-release mechanism 22 comprises a prismatic insert 25 fixed (and therefore coupled in rotation) to the neck gripper 7.

In the locking position, the insert 25 is received in a prismatic housing 26 of complementary shape provided in the inner wall of the arm 5, thereby preventing rotation of the neck gripper 7, whereas in the release position, the insert 25 is located outside its housing 26, thereby allowing rotation of the neck gripper 7.

In addition, the lock-and-release mechanism 22 comprises at least one pin 27 protruding from the inner wall of the arm 5. In the locking position, the pin 27 is received in a corresponding hole 28 of complementary shape formed in the respective neck gripper 7, in order to maintain the neck gripper 7 in a precise angular position (i.e. aligned with the arm 5) around the rotation axis 8 in the locking position.

Format changeover, by swapping the gripping jaws 9a, 9b, is achieved as follows (see the sequence illustrated on FIG. 5-8).

First, starting from a locking position where gripping jaws 9a of a first format are locked in their use position whereas the gripping jaws 9b of the second format are in the inactive position, a pressure is exerted on both buttons 23 as shown by the straight arrows on FIG. 5, to push the neck grippers 7 towards each other to their release position, where the inserts 25 and pins 27 are outside their corresponding housings 26 and holes 28.

The neck grippers 7 are then rotated around their rotation axis 8, as shown by the circular arrows on FIG. 6, either manually or automatically (e.g. by means of a cam mechanism), until they have achieved a 180° twist, where the inserts 25 and pins 27 are located in front of respective housings 26 and holes 28 (FIG. 7).

Pressure on the buttons 23 is then released. Under tension of the return spring 24, the neck grippers 7 are pulled to their use position. The inserts 25 and pins 27 are received in the respective housings 26 and holes 28, and the gripping jaws 9b of the second format are placed in the use position, whereas the gripping jaws 9a of the first format are placed in the inactive position.

Such a clamp 1 avoids clamp replacement (and therefore clamp storage) when a format changeover is needed, and allows time and workforce savings.

The invention claimed is:

1. A clamp for holding a container by a neck in a container handling machine, said clamp comprising a pair of resilient arms and a pair of neck grippers provided at respective ends of the arms, said arms and said neck grippers configured to allow the container neck to be laterally engaged between the neck grippers, each neck gripper is pivotally mounted on the corresponding arm about a rotation axis, and has at least two gripping jaws of different dimensions, configured to cooperate with container necks of different sizes.

2. The clamp according to claim 1, wherein each gripping jaw is provided with a rounded tooth configured to cooperate with a groove defined between a collar and an annular flange of the container neck.

3. The clamp according to claim 2, wherein each gripping jaw is provided with a planar contact surface configured to cooperate with a lower surface of said annular flange.

4. The clamp according to claim 2, further comprising a lock-and-release mechanism having a locking position wherein rotation of the neck gripper is blocked, and a release position wherein rotation of the neck gripper is allowed.

5. The clamp according to claim 4, wherein each neck gripper is slideable with respect of the arm along its rotation axis, between the locking position and the release position.

6. The clamp according to claim 5, wherein the lock-and-release mechanism comprises a button provided at one outer end of the rotation axis, and a return spring mounted on the axis between the button and an outer wall of the arm for biasing the neck gripper towards the arm.

7. The clamp according to claim 5, wherein the lock-and-release mechanism comprises a prismatic insert coupled to the neck gripper, said insert being received, in the locking position, in a housing of complementary shape provided in the arm, whereas the insert is located outside the housing in the release position.

8. The clamp according to claim 4, wherein the lock-and-release mechanism comprises at least one pin provided on one arm and which, in the locking position, is inserted in a corresponding hole provided in the respective neck gripper.

9. A clamp for holding a container by a neck in a container handling machine, comprising:
   a pair of resilient arms;
   a pair of neck grippers at respective ends of the arms;
   the arms and the neck grippers configured to allow the container neck to be laterally engaged between the neck grippers;
   each neck gripper is a separate structural piece from the arms and is rotatably mounted about a rotation axis to the neck gripper's respective arm;
   each neck gripper has at least two gripping jaws of different dimensions, configured to cooperate with container necks of different sizes.

10. The clamp according to claim 9, wherein each neck gripper rotatably mounted about a rotation axis to the neck gripper's respective arm so as to rotate by at least 180 degrees.

11. The clamp according to claim 9, wherein each gripping jaw is provided with a rounded tooth configured to cooperate with a groove defined between a collar and an annular flange of the container neck.

12. The clamp according to claim 11, wherein each gripping jaw is provided with a planar contact surface configured to cooperate with a lower surface of said annular flange.

13. The clamp according to claim 11, further comprising a lock-and-release mechanism having a locking position wherein rotation of the neck gripper is blocked, and a release position wherein rotation of the neck gripper is allowed.

14. The clamp according to claim 13, wherein each neck gripper is slideable with respect of the arm along its rotation axis, between the locking position and the release position.

15. The clamp according to claim 14, wherein the lock-and-release mechanism comprises a button provided at one outer end of the rotation axis, and a return spring mounted on the axis between the button and an outer wall of the arm for biasing the neck gripper towards the arm.

16. The clamp according to claim 14, wherein the lock-and-release mechanism comprises a prismatic insert coupled to the neck gripper, said insert being received, in the locking position, in a housing of complementary shape provided in the arm, whereas the insert is located outside the housing in the release position.

17. The clamp according to claim 13, wherein the lock-and-release mechanism comprises at least one pin provided on one arm and which, in the locking position, is inserted in a corresponding hole provided in the respective neck gripper.

* * * * *